Oct. 9, 1928.

E. A. CORBIN, JR 1,687,237

RESILIENT TRANSMISSION FOR VEHICLE WHEELS

Filed Sept. 10, 1927     3 Sheets-Sheet 1

INVENTOR
Elbert A. Corbin Jr
BY Herbert S. Fairbanks
ATTORNEY

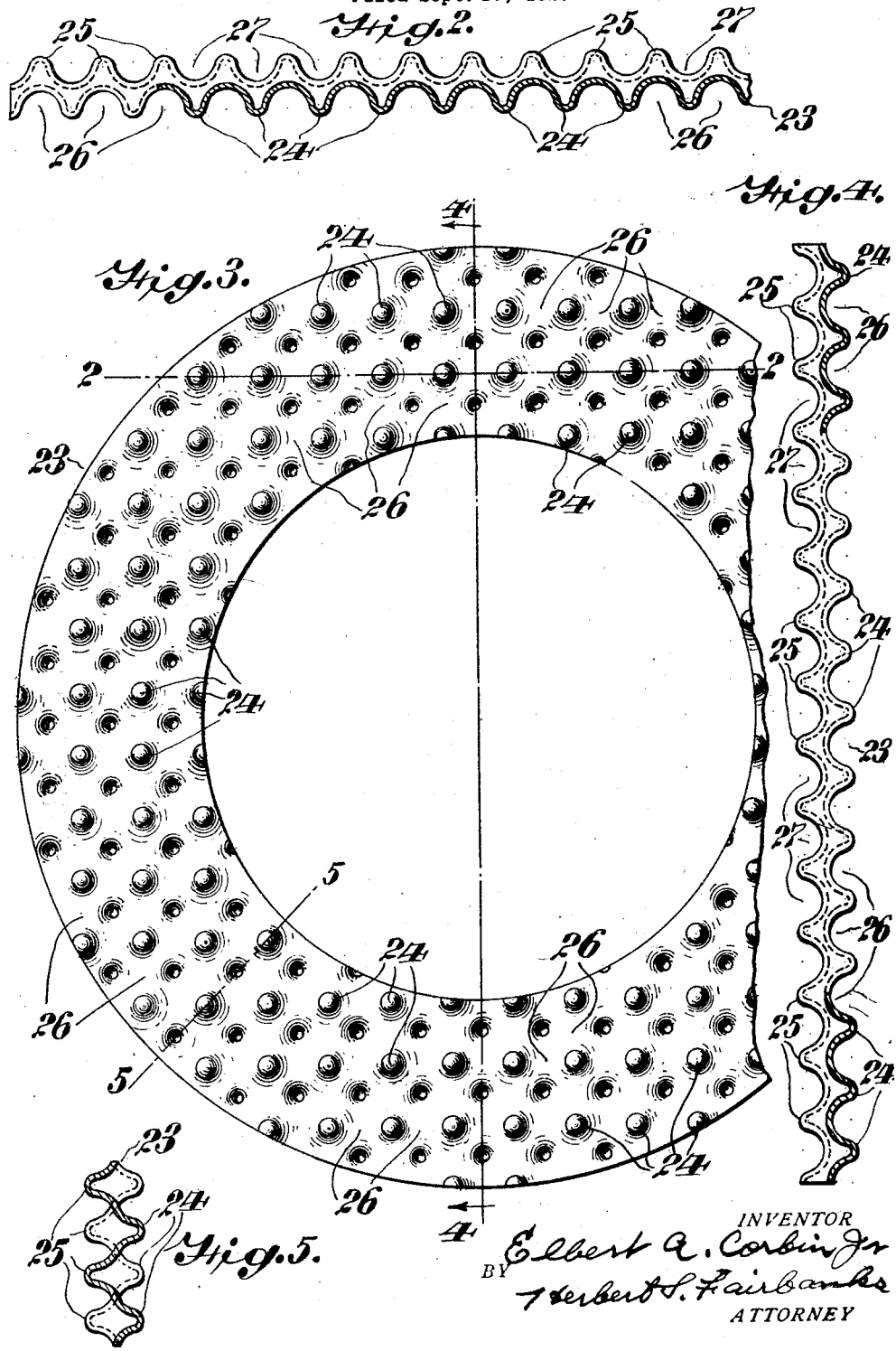

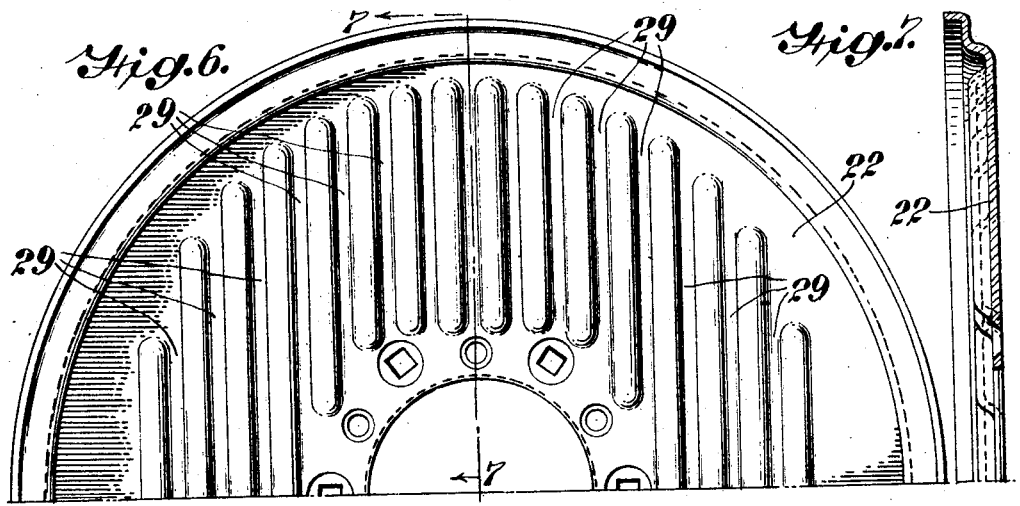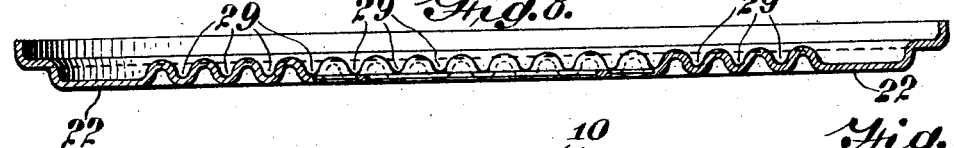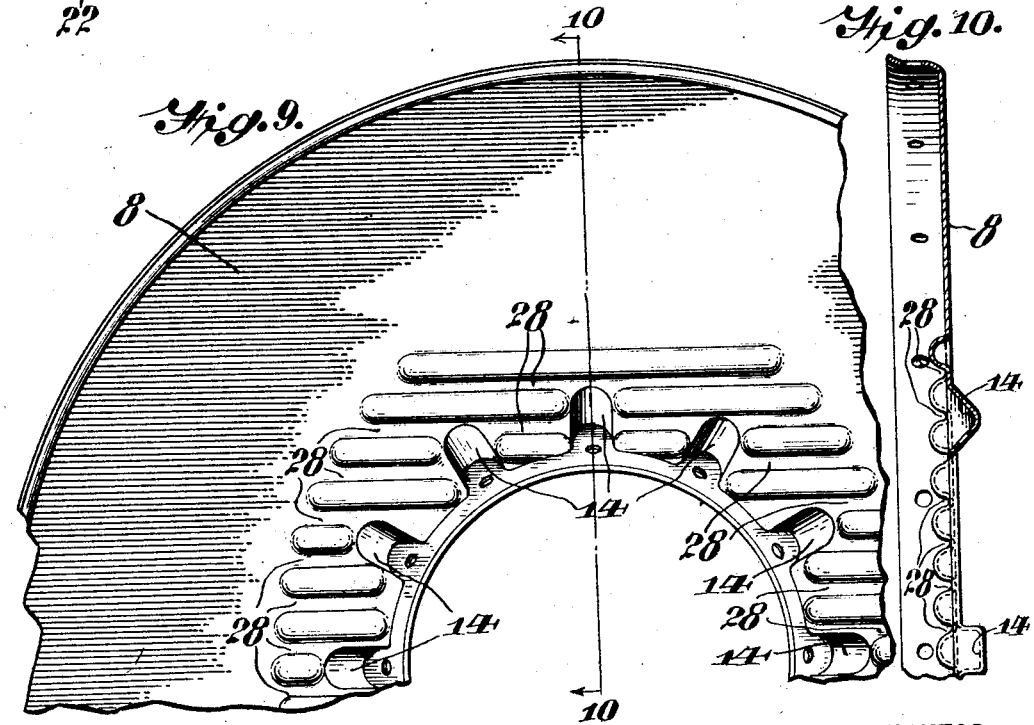

Patented Oct. 9, 1928.

1,687,237

UNITED STATES PATENT OFFICE.

ELBERT A. CORBIN, JR., OF SWARTHMORE, PENNSYLVANIA, ASSIGNOR OF ONE-THIRD TO WILLIAM C. BIDDLE, OF LANSDOWNE, PENNSYLVANIA, AND ONE-THIRD TO WILLIAM A. BROWN, OF PHILADELPHIA, PENNSYLVANIA.

RESILIENT TRANSMISSION FOR VEHICLE WHEELS.

Application filed September 10, 1927. Serial No. 218,604.

In a co-pending application Serial No. 209,104, filed July 28, 1927, for cushion wheels, which has matured into Patent No. 1,664,389, dated March 27, 1928, I have described and broadly claimed a novel cushion wheel which may have embodied in it a resilient transmission, or a resilient bearing, or a combined resilient transmission and bearing, and which may be employed either as a driving or as a driven vehicle wheel.

When used as a resilient transmission, a vehicle wheel of this type is provided with two revoluble members capable of eccentric displacement, with an intermediate power transmitting element in slidable engagement with said members, and with resilient means which tend to maintain the axial alignment of the revoluble members.

It is more particularly the object of this invention to devise a novel construction and arrangement of an intermediate power transmitting element which can be formed from an integral piece of material thereby materially reducing the cost of manufacture, and the member is formed in a novel manner to provide spaced driving elements and spaced recesses which contribute to maintain a more effective lubrication of juxtaposed surfaces of the transmission.

With the above and other objects in view as will hereinafter more clearly appear, my invention comprehends a novel construction and arrangement of a resilient transmission for vehicle wheels.

It further comprehends a novel construction and arrangement of an intermediate power transmitting member having spaced knobs or protuberances projected therefrom to provide the driving elements for the cooperating driving parts of the transmission. These protuberances trap grease between each other and form a perfect lubrication when mated with the juxtaposed plates.

Other novel features of construction and advantage will hereinafter more clearly appear in the detailed description and the appended claims.

For the purpose of illustrating the invention, I have shown in the accompanying drawings, a typical embodiment of it, which, in practice will give satisfactory and reliable results. It is, however, to be understood that this embodiment is typical only and that the various instrumentalities of which my invention consists can be variously arranged and organized, and the invention is not, therefore, limited to the precise arrangement and organization of these instrumentalities as herein set forth.

Figure 2 is a section on line 2—2 of Figure 3.

Figure 3 is a side elevation partly broken away, of the intermediate driving element, in detached position.

Figure 4 is a section on line 4—4 of Figure 3.

Figure 5 is a section on line 5—5 of Figure 3.

Figure 6 is a side elevation of a hub member cooperating with the intermediate driving member.

Figure 7 is a section on line 7—7 of Figure 6.

Figure 8 is a transverse section of the member seen in Figure 6.

Figure 9 is a side elevation showing a portion of the wheel member seen in Figure 1, cooperating with the intermediate driving element.

Figure 10 is a section on line 10—10 of Figure 9.

Similar numerals of reference indicate corresponding parts.

Referring to the drawings:—

Figure 1:
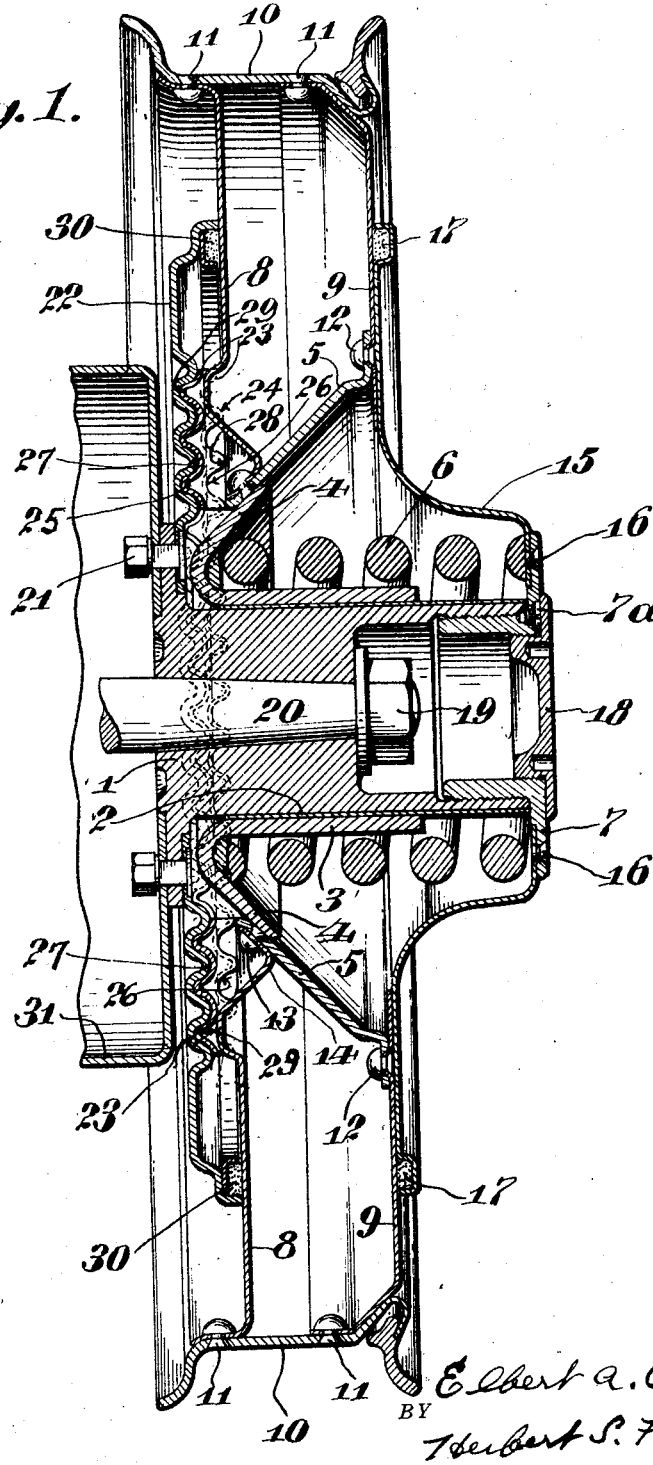
Figure 1 is a vertical section view of a resilient transmission for vehicle wheels embodying my invention.

1 designates a hub which is provided with a steel bearing sleeve 2 secured thereto in any desired manner and preferably by shrinking it thereon, and on this bearing sleeve 2, is loosely mounted a sleeve 3, having a bearing or skirt 4 which is preferably disposed at an angle of 45° with the axis of the hub 1 and which is supported concentrically when it rests within a cone shaped bowl 5 by means of a spring 6, which, in turn, presses against the hub cap 7 which is screwed within the outboard end of the hub 1.

The bowl 5 is cone shaped and truncated at its peak and is curved at its base forming into a cylinder parallel with the axis at the base, and cooperates with the skirt 4 of the reciprocating sleeve 3, which is cone shaped and truncated at the peak and is formed at its base into a cylinder with a smaller radius than that of the base of the bowl cone, said cylinder being parallel with the main axis of said skirt base, thus providing a positive means for slowing up the action of the device upon approaching its position of greatest stress.

The outer part of the wheel is formed by the discs 8 and 9 which are attached to the rim 10 by means of fastening devices 11.

The bowl 5 is rigidly connected with the disc 9 means of fastening devices 12 and with the disc 8 by means of fastening devices 13, it being seen that the disc 8 is laterally deflected as at 14, see more particularly Figure 10, to provide the necessary clearance to effect the riveting operation.

The hub cap 7 is in the form of a nut to which is rigidly connected an abutment disc 15 by means of fastening devices 16. The disc 15 is gasketed by the packing 17 with the disc 9, and such packing 17 serves to retain the grease or lubricant within the wheel. A closing plate 18 is in threaded engagement with the cap nut 7 and covers the nut 19 which serves to hold the axle 20 to the wheel.

The hub 1 has connected with it by means of fastening devices 21, an abutment disc 22 which is the equivalent of a hub flange, and between the disc 22 and the disc 8 is interposed an intermediate power transmitting or driving member 23, which is constructed in a novel manner. This intermediate member 23 is in the form of a ring preferably formed from a single piece of material. The material is projected to form the spaced driving elements 24 on one side of the ring, and the spaced driving elements 25 on the opposite side of the ring.

These driving elements are so disposed that between juxtaposed rows of driving elements there is a row of depressions or recesses, such as for example, on the outboard face the depressions 26, and on the inboard face the depressions 27, which form lubricant receiving recesses.

The driving elements 24 are in the form of knobs or rounded protuberances and are adapted to be received in the flutes 28 in the disc 8, and the driving elements 25 are formed in a similar manner and are adapted to be received in the flutes 29 in the hub disc 22. This hub disc 22 is gasketed at 30 with the disc 8. The hub 1 has secured to it as illustrated, by means of the fastening devices 21, a brake drum 31, see Figure 1.

The part of the wheel formed by the discs 8 and 9 attached to the rim 10 is slidably held within the hub abutment discs 22 and 15 so that the transmission includes two revoluble members which are capable of eccentric displacement, and due to the provision of the abutment disc 15, the construction is equalized for side thrusts and allows the wheel to float freely within these two discs 22 and 15, which form side abutments. The intermediate power transmitting member 23 is, so to speak, floating between the hub disc 22 and the wheel disc 8 with its driving elements on opposite sides in operative relation with the flutes or depressed channels 28 and 29, so that there are large areas of impinging surfaces which reduce specific pressures to a minimum, and, for this reason, this construction can be used under any desired road conditions.

The packings 17 and 30 not only make an effective seal between the moving parts to prevent loss of lubricant, but act as a mild lubricant themselves between the inboard and outboard abutments and the wheel discs 8 and 9, effectually covering the coacting surfaces with a film of lubricant and forcing back, during the action of the wheel, silt, grit, and other foreign material from the inner working parts of the wheel.

The suitably spaced screws $7^a$ serve to hold the outer abutment disc 15 and the hub cap 7 in permanent assembly on the hub 1.

By removing the cap 18 and the nut 19, the entire structure can be readily dismounted from the axle, so that the wheel can be removed as a unit of structure without dismantling the transmission.

The spring 6 tends to maintain the two revoluble members in axial alignment, and the coacting sleeve and cone shaped bowl serve as a compensating and shock absorbing device, and on account of their shapes as a rebound dampener, and provide an indirect spring support since all blows are at right angles with the ground and are taken in a direction parallel with the hub and are absorbed in the spring 6.

On account of the large area of the projecting elements of the integral driving ring and the manner in which they are disposed, the surfaces of the driving elements 24 and 25 are subjected to light specific pressures when torque occurs, and these surfaces will last indefinitely in service.

It will thus be seen that any position assumed by the wheel when in action, which changes the position between the intermediate power transmitting element and the discs 22 and 8, provides an even and an automatic readjustment of the position of these three coacting members at all times, no matter how great the torque may be, the speed of rotation of the wheel, or the intensity of the road or load shocks to which the wheel is subjected. When the parts reach their ultimate extent of movement and are subjected to further road or load shocks, the wheel absorbs the thrusts to which it is subjected as an ordinary stiff wheel with the advantage of having dampened out the greater part of the stresses and strains which might otherwise prove destructive to the conventional type of stiff or rigid wheel construction.

The frictional engagement of the two supporting members of the vehicle wheel, is such that at its position of greatest stress, the cooperating curved surfaces merge into the conical and cylindrical surfaces and serve to progressively restrict and retard the maximum movement of the parts, and thus absorb the shocks which would otherwise be present under such conditions. This causes a gradual building up of a frictional resistance which overcomes the liability of any of the parts to become broken or distorted under abnormal shocks and stresses.

The driving engagement is of such a character that the total length of the driving elements is of greater length than the diameter of the inner member, and this driving means is distributed over substantially the entire side walls of the intermediate driving element, it of course being understood that the driving elements formed by the knobs or protuberances are disposed in spaced relationship, preferably over the entire area of the intermediate power transmitting member.

There is a continuous torque on the driven members which eliminates any lash or reversal of the torque such as takes place with a sudden shock or braking action on wheel constructions as heretofore employed.

I have found in practice that if the rows of driving elements on one side of the power transmitting member are disposed at an angle of approximately 90° to rows of driving elements on the opposite side of said power transmitting member, that very advantageous results are obtained.

The angle, however, may vary in practice and any angle between 80° and 90° can be employed.

It will now be apparent that I have devised a new and useful resilient transmission for vehicle wheels which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. The herein described power transmitting member in the form of a ring having projecting from opposite faces spaced driving elements distributed over substantially the entire areas of such faces to form rows of driving elements in spaced relationship longitudinally of the rows.

2. The herein described power transmitting member in the form of an integral ring having projecting from opposite faces spaced driving elements distributed over substantially the entire areas of such faces to form rows of driving elements in spaced relationship longitudinally of the rows, and with the rows extending both vertically and laterally of the member.

3. The herein described power transmitting member in the form of a ring having projecting from opposite faces spaced driving elements distributed over substantially the entire areas of such faces to form rows of driving elements in spaced relationship longitudinally of the rows, and with the driving elements on one face forming recesses on the opposite face of said member.

4. The herein described power transmitting member comprising a ring having projected from opposite sides integral spaced knobs arranged in rows to provide rows of driving elements on one side disposed at angles to rows of driving elements on the opposite side of said ring.

5. The herein described power transmitting member having projecting from opposite faces spaced driving elements, the driving elements on one face forming rows of recesses on the opposite face so that each side of said member is provided with alternately disposed rows of driving elements and recesses.

6. The herein described power transmitting member comprising a disc having projecting from opposite faces spaced driving elements arranged in rows with the driving elements in spaced relationship longitudinally of the rows, the rows on each face being parallel with each other, and the rows on one face extending in a direction at an angle to the rows on the opposite face.

ELBERT A. CORBIN, Jr.